United States Patent

Dooner et al.

[11] Patent Number: 5,201,690
[45] Date of Patent: Apr. 13, 1993

[54] GEAR SYSTEM FOR MOTION TRANSFORMATION

[76] Inventors: David B. Dooner, P.O. Box 109, Quincy, Fla. 32351; Ali A. Seireg, 2670 S.W. 14th Dr., Gainesville, Fla. 32608

[21] Appl. No.: 860,161

[22] Filed: Mar. 30, 1992

[51] Int. Cl.⁵ .............................................. F16H 3/72
[52] U.S. Cl. ........................................ 475/17; 475/3; 475/7; 475/8; 475/16
[58] Field of Search .................. 475/3, 7, 8, 17, 16

[56] References Cited

U.S. PATENT DOCUMENTS

| | | | |
|---|---|---|---|
| 1,613,646 | 1/1927 | Dailey | 475/3 |
| 2,142,700 | 1/1939 | Simonds | 475/17 |
| 2,553,465 | 5/1951 | Monge | 475/3 |
| 3,919,895 | 11/1975 | Kerr | 475/16 |
| 4,055,091 | 10/1977 | Kerr | 475/16 |
| 4,909,101 | 3/1990 | Terry, Sr. | 475/16 |
| 4,944,718 | 7/1990 | Takahara et al. | 475/16 |
| 4,969,860 | 11/1990 | Takami et al. | 475/17 X |

FOREIGN PATENT DOCUMENTS

| | | | |
|---|---|---|---|
| 2726515 | 12/1978 | Fed. Rep. of Germany | 475/7 |
| 57-192654 | 11/1982 | Japan | 475/7 |
| 1-283448 | 11/1989 | Japan | 475/7 |

Primary Examiner—Allan D. Herrmann
Assistant Examiner—William O. Trousdel
Attorney, Agent, or Firm—Edward M. Livingston

[57] ABSTRACT

A gear system for mechanically transforming motion on an infinitely variable basis as desired, having a unique arrangement of gear elements and clutches between the input and output shafts (1 and 6). A first set of gears (2) divides the motion put into the system through the input shaft (1). A controller (7) sets the phase shift in the division of motion from the first set of gears (2). Sets of non-circular gears (3) connecting the intermediate shafts (9) to "on/off" clutches (4) transform the motion output from the first set of gears (2). Finally, the resulting motion from the clutches is transferred to an output shaft (6) through a third set of gears in a summing device (5). Shaft (6) is connected to a load (not shown). The output shaft (6) is connected to the input shaft (1) by means of an "on/off" clutch (8) which is normally disengaged during variable motion transformation, but which can be engaged when the same output motion as input motion to the system is desired, without loading any of the gears during such equal motion operations.

8 Claims, 2 Drawing Sheets

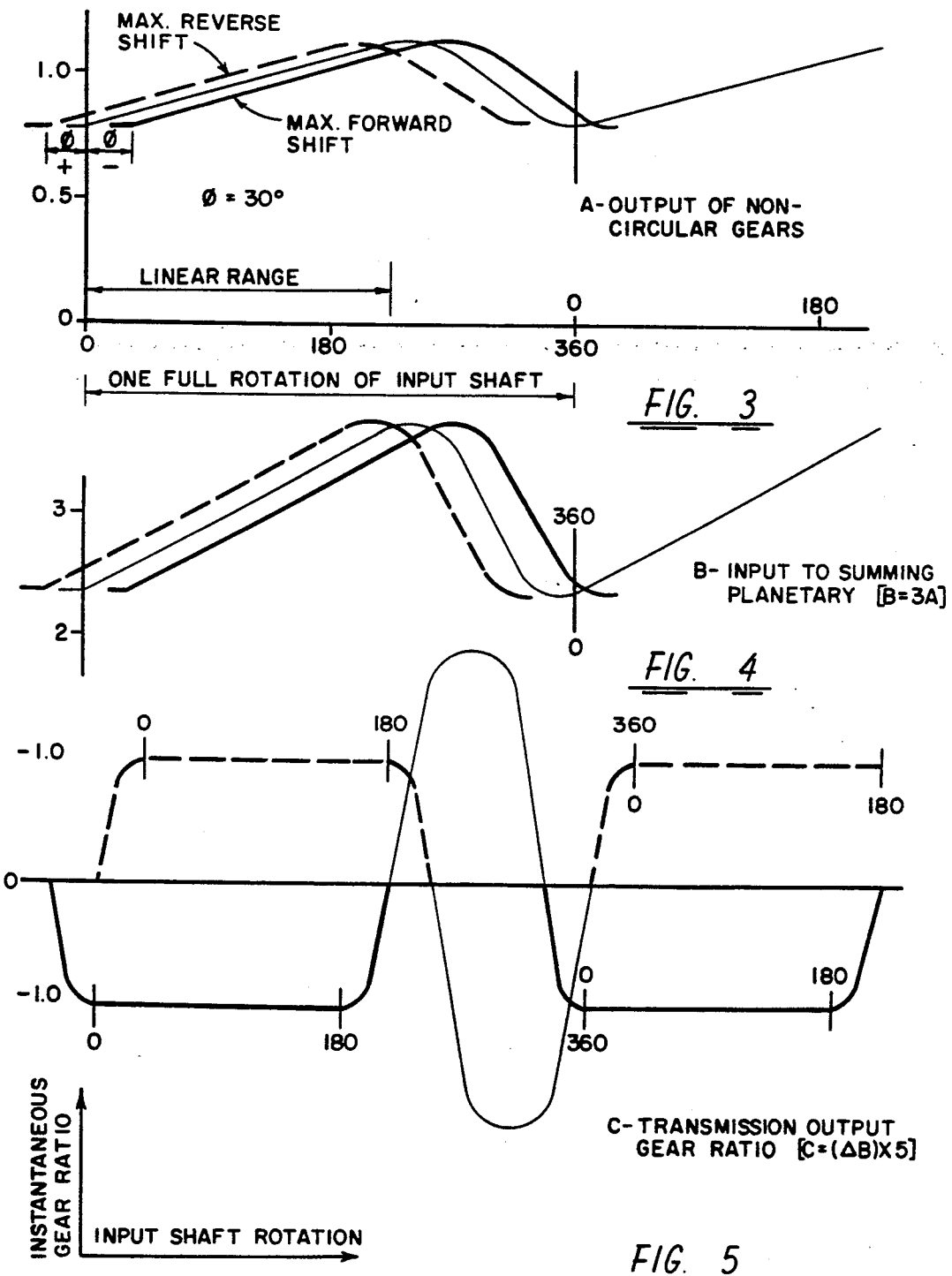

GEAR SYSTEM FOR MOTION TRANSFORMATION

BACKGROUND OF THE INVENTION

This invention relates to gear systems for use in transmissions to provide infinitely variable and smooth transmission of speed and other motion transformations.

The problem which is prevalent with transmissions and other motion transformation devices is the difficulty of producing a continuously variable and smooth desired output from an input motion in the desired speed ratio. Most transmission devices do not accomplish the transformation of input motion to desired output motion in a smooth manner, resulting in speed fluctuations evidenced by "jerking" motions and inefficiency resulting in loss of speed and torque between the input and output of the transmission.

Thus, there is a need for a device like the present invention for the transmission of mechanical power which is capable of transforming an available input motion to an output motion with the desired characteristics.

The relevant prior art contains some patents which have attempted to fulfill the above referenced need, but none have done so successfully or in the same manner as the present invention.

For instance, U.S. Pat. No. 3,919,895 by Kerr, issued Nov. 8, 1975, discloses a variable output transmission that uses two sets of four "sawtooth" (or square-wave) gears and a summing device which incorporates beveled gear trains and over-running clutches. Due to the sharp transition in the sawtooth pattern, undesirable dynamics and certain inefficiencies are expected to occur in motion transformation.

U.S. Pat. No. 4,055,091 also by Kerr, issued Oct. 25, 1977, discloses a variable output transmission which is essentially the same as the first Kerr patent except that it has a new control element and gear-running clutches are repositioned, but it is still a variation of the same device.

Another U.S. Pat. No. 4,969,860 by Takami, et al., issued Nov. 13, 1990, discloses a stepless transmission mechanism that uses non-circular gears which generate a sawtooth wave function. The latter device contains a rotating housing for the input and output planetary gear trains which requires special balancing considerations due to phase shift. Furthermore, this device produces a sharp transition in speed ratio and gear profile.

U.S. Pat. No. 4,909,101 by Terry, Sr., issued Mar. 20, 1990, also discloses a continuously variable transmission in which power is input to a sun gear which, in turn, drives four planetary gears surrounding the sun gear in a circular fashion. Although the latter device attempts to accomplish the same goal as the present invention it is very different from a mechanical standpoint.

Another U.S. Pat. No. 4,944,718 by Takahara, et al., issued Jul. 31, 1990, shows an angular velocity modulating device which is also very different from the present invention.

Contrary to the inventions in the prior art which is restricted to constant input/output relations, the present invention employs sets of non-circular gears, either spur or spiral, in conjunction with clutches and other circular gear trains for dividing, multiplying and summing with the necessary phase changes to produce the desired relation between input and output motion. In the present invention the desired motion characteristics can be synthesized by summation of appropriate segments of the output from the non-circular gears activating "on/off" clutches using mechanical, electric or fluid control as well as self activation, based on the relevant movement of engaging elements. The resulting transmission device of the present invention can be utilized in almost any vehicle where motion transformation is desired, such as automobiles and bicycles.

Summary of the Invention

The primary object of the present invention is to provide a device for transmission of mechanical power which is capable of transforming an available input motion to an output motion with desired characteristics.

Another object of the present invention is to provide a transmission which can be used to eliminate torque and speed fluctuations.

A further object of the present invention is to provide such a transmission device that accomplishes the transformation of motion in an efficient manner by eliminating loss from input to output.

An additional object of the present invention is to provide a device which enables the ratio of the output to input speed to be controlled on a continuously or infinitely variable fashion.

The present invention accomplishes the above and other objects by providing a gear system that uses an input shaft for introducing motion into the system. Said input shaft is connected to a first set of gears which divide the motion. A means for controlling the shift during the division of motion may be gear sets controlled by external dials. This first set of gears is connected to a set of non-circular gears which are connected to intermediate shafts. This latter set of gears is connected to other intermediate shafts by "on/off" clutches which select appropriate segments of the motion output from the non-circular gears. Next, another set of gears which sum these outputs to provide motion from the system to a load connected to an output shaft. If it is desired that the output motion equal the input motion, then a clutch which is normally disengaged can be engaged to rotate the output shaft in the same manner as the input shaft without loading the other gears.

Further objects and the details of this invention will become more readily apparent when a preferred embodiment of the invention is described in conjunction with the drawings.

BRIEF DESCRIPTION OF THE DRAWINGS

The drawings in conjunction with which a description of the preferred embodiment is presented are as follows:

FIG. 3 is a graph showing the output of the non-circular gears in this transmission;

FIG. 4 is a graph showing the input to the summing gears of this transmission; and FIG. 5 is a graph showing the input to output relationship of the transmission.

DESCRIPTION OF THE PREFERRED EMBODIMENTS

Figure 1:
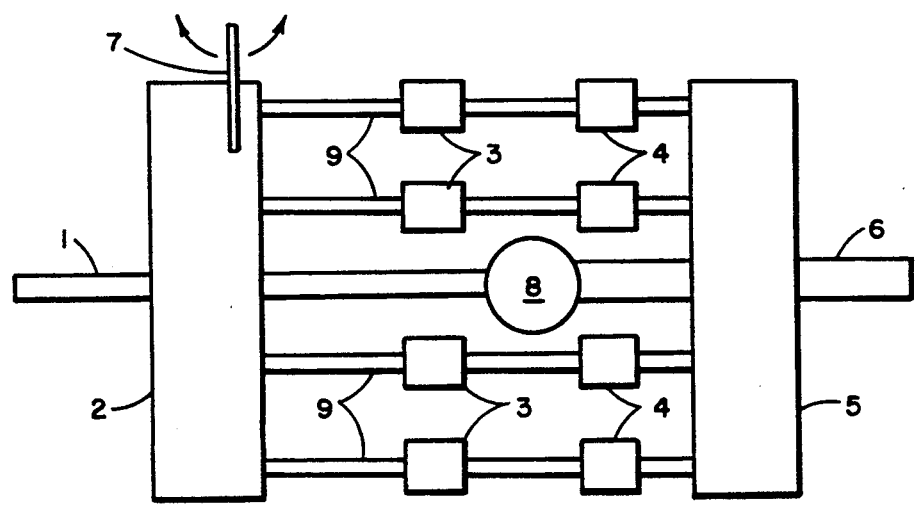
FIG. 1 is a schematic diagram of the gear system which is the subject of this invention.

Referring now to FIG. 1, the general workings of the present invention and its components are illustrated schematically. First, motion is applied to the motion input shaft 1 which is attached to a gear train 2 containing gear sets, for the purpose of dividing the input motion. A control device 7 is utilized in conjunction with the input gear trains 2, which may be positioned to induce any necessary phase shift of the divided motions. The divided motion is then transmitted from the gear train 2 through intermediate input shafts 9 to non-circular gear sets 3 consisting of spur or spiral gears, the design and number of which depends on the motion to be generated. The motion is then transmitted to "on/off" clutches 4 which select appropriate segments of the output of the non-circular gears 3. The resulting motion is then fed into a gear train 5 containing gear sets for summing the motion. The motion is then transmitted though the output shaft 6 to a load (not shown).

In addition to the above features, an "on/off" clutch 8 is placed between the input shaft 1 and output shaft 6. The "on/off" clutch 8 is normally disengaged and is engaged only when the input motion and the desired output motions are to be identical.

Thus, the present invention, as illustrated in FIG. 1, has several noteworthy features. One feature is it provides the optimal design and number of non-circular gear sets to provide any particular motion transformation. Another feature is that the input gear trains are enclosed in a stationary housing. In addition, the invention has the ability to synthesize a variety of motion transformations by using a limited number of modular non-circular gear sets 3. Any desired motion transformation can be achieved by coordinating in synchronized fashion the phase shift controller 7 with the activation of the clutches 4.

A further important feature is that if one does not desire to vary the output motion from that of the input motion, the input and output shafts, 1 and 6 respectively, can be directly connected, without power circulation in the system which often results in power loss evidenced in other such devices.

Having described the invention in general, as illustrated in FIG. 1, it is now useful to discuss in detail the actual mechanics of a specific embodiment of the present invention. Although many other arrangements with different non-circular gears and gear trains could be devised, any such device would be based on the same fundamental approach as the present invention as described hereinafter and illustrated in FIG. 2.

Figure 2:
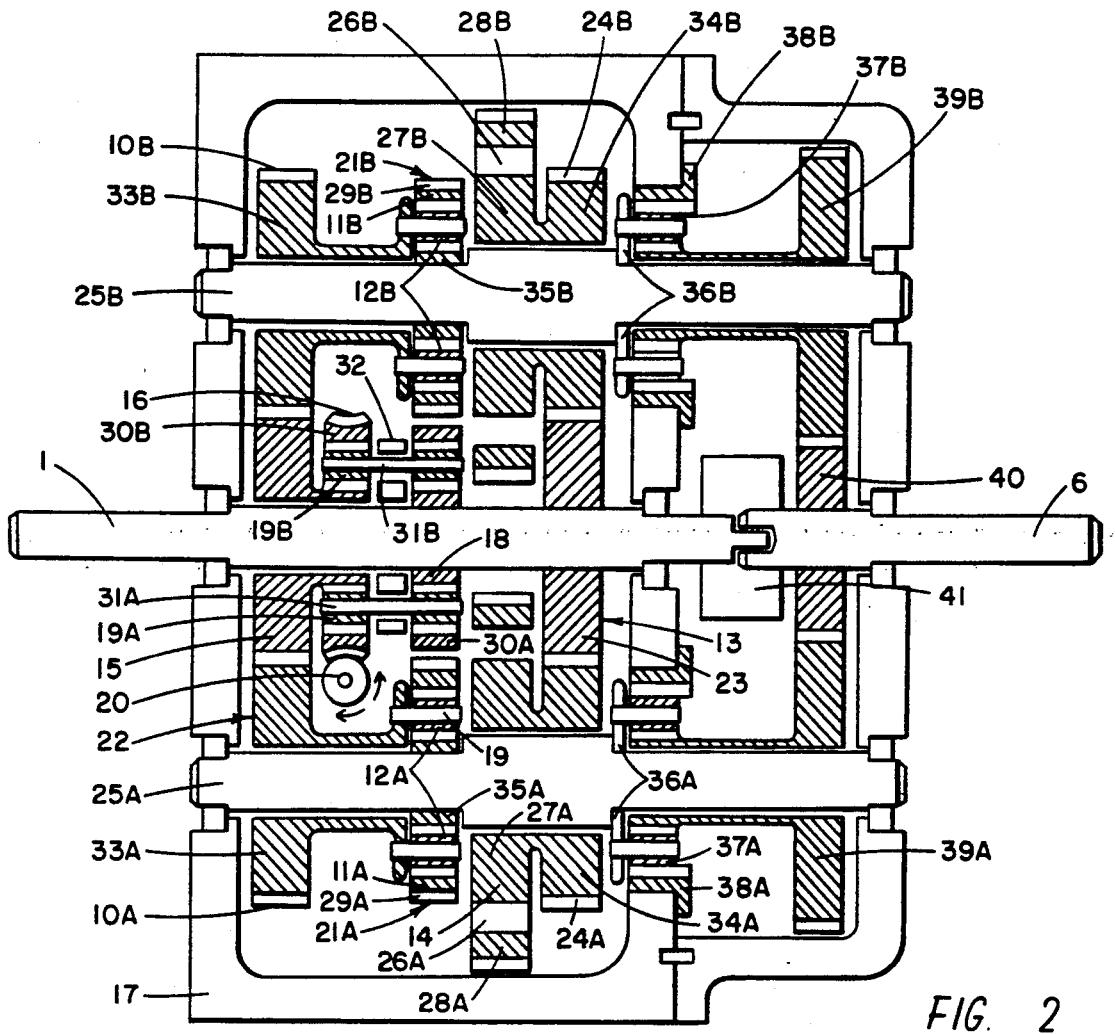
FIG. 2 is a cross-sectional view of a transmission employing the gear system of this invention.

Upon reviewing FIG. 2, several items should be initially

First, the planetary summing devices 21a and 21b are composed of ring gears 11a and 11b, planet gears 12a and 12b and sun gears 35a and 35b. The summing is accomplished without the need for a rotating substructure or center spool as is the case with other devices in the prior art. A second item to note is that the first non-circular gear sets consists of gear 13 and the non-circular gear elements 24a and 24b of bodies 34a and 34b. A third feature to note is that the second non-circular gear set consists of the segment of body 15 which is identical to gear 13 and the mating elements 10a and 10b which are identical to non-circular gear elements 24a and 24b. A final feature to note is that the phase shift between gears 13 and 15 is achieved by the control element 20 which creates a relative change in angular position of the ring gear 16 relative to the fixed housing 17.

Discussing the components of the device by reference to FIG. 2, the input shaft 1 is rotatably supported by the fixed housing 17. Affixed to the input shaft 1 are the non-circular gear 13 and the sun gear 18. The sun gear 18 and the non-circular gear 13 rotate at the same speed as the input shaft 1. These latter two gears provide the inputs to the two planetary summing devices 21a and 21b.

The first input to the summing devices 21a and 21b is through the non-circular gear 13. In mesh with the gear 13 are the two mating non-circular gear elements 24a and 24b. The non-circular gear elements 24a and 24b of bodies 34a and 34b are concentric and free to rotate on intermediate shafts 25a and 25b, respectively. Affixed to the non-circular gear elements 24a and 24b are the inner races 27a and 27b for the clutches 26a and 26b. These clutches 26a and 26b are concentric about the shafts 25a and 25b, respectively, and the outer races 28a and 28b for the clutches 26a and 26b are identical external gears. In the preferred embodiment, as shown in FIG. 2, an angular displacement of 360° of the input shaft 1 (one full rotation) produces angular displacements of 360° for bodies 34a and 34b, respectively.

When the clutches 26a and 26b are engaged, the external gears 28a and 28b of bodies 34a and 34b become rigidly connected to the non-circular gears 24a and 24b of bodies 34a and 34b, respectively. In constant mesh with the two external gear elements 29a and 29b. The two external gear elements 29a and 29b are concentric and free to rotate about two shafts which are parallel to the shafts 25a and 25b, respectively. The plane determined by the two axes of rotation associated with the external gear elements 29a and 29b is equal distance and positioned above the plane determined by the two axes of rotation associated with the external gear elements 28a and 28b. One rotation of the gear bodies 24a and 24b produces 2¼ rotations of the gears 29a and 29b respectively, when the clutches are engaged.

Gears 29a and 29b are always in mesh with ring gears 11a and 11b, respectively. The latter gears are concentric with respect to shafts 25a and 25b, respectively. One rotation of gears 29a and 29b produces ⅔ of a rotation for ring gears 11a and 11b, respectively. Thus, one rotation of bodies 28a and 28b produces 1½ (2¼×⅔) rotations of ring gears 11a and 11b, respectively.

The second input to the summing devices 21a and 21b is through the sun gear 18 which is fixed to the input shaft 1. The sun gear 18 is in mesh with two planet pinions 19a and 19b which are also in mesh with a ring gear 30a which is rigidly fixed to the housing 17. The shafts 31a and 31b of the planet pinions 19a and 19b will therefore rotate about the axis of the input shaft 1 guided by an arm 32 which is free to rotate about the input shaft 1. Each shaft 31a or 31b of the two planet pinions 19a and 19b supports another identical planet pinion which is in mesh with a circular gear element of body 15 as well as ring gear 30b. The position of ring gear 30b relative to housing 17 is controlled by the control element 20. Preferably, the controller 20 would be a self-locking worm gear or any other non-back driveable device. The non-circular gear element of body 15 is identical to gear 13. The movement of the control element 20 which in turn changes the position of ring gear 30b, controls the phase between the non-circular gear 13 and the non-circular gear element of body 15.

Two non-circular gears 33a and 33b, which are identical to the non-circular gear elements 24a and 24b of gear bodies 34a and 34b, are continuously in mesh with the non-circular gear element of body 15. Non-circular gears 33a and 33b are concentric about shafts 25a and 25b, respectively, and are free to rotate about them.

The non-circular gears 33a and 33b, respectively, provide the second input to the planetary summing devices 21a and 21b through the two pairs of planet gears 12a and 12b which are continuously in mesh with ring gears 11a and 11b as well as the sun gears 35a and 35b, respectively. The gears 35a and 35b are concentric about and fixed to shafts 25a and 25b, respectively.

Likewise, arms 36a and 36b are also concentric about and fixed to shafts 25a and 25b, respectively. Each arm 36a or 36b drives a pair of planet pinions 37a and 37b which are continuously in mesh with ring gears 38a and 38b which are fixed to the housing 17. The sun gear elements of bodies 39a and 39b are free to rotate about shafts 25a and 25b, respectively.

Next, gear 40 is concentric about and fixed to the output shaft 6 which is continuously in mesh and driven by two other gear elements of bodies 39a and 39b.

The clutch 41 that is normally disengaged, can be engaged to directly connect the input shaft 1 to the output shaft 6, whenever it is desired that the output motion be the same as the input motion. In the latter case, the two shafts 1 and 6 rotate at the same speed in order to avoid loading any of the other gears during such operating conditions. This latter fact increases efficiency of the device when variations between input and output motions are not necessary or desired.

A look at the performance of the present invention from a graphical stand point is useful. Assuming one full rotation of the input shaft 1, the graphs in FIGS. 3, 4 and 5 illustrate the performance of the invention.

First, in FIG. 3 the output of the non-circular gear sets designated by numeral 3 in FIG. 1 and numerals 24 and 33 in FIG. 2, is illustrated where the phase between the two as set by the phase shift control designated by numeral 7 in FIG. 1 or numeral 20 in FIG. 2 has been set at 30°.

In FIG. 4 the input to the summing planetary gear devices designated by numeral 5 in FIG. 1 or numerals 11 and 12 in FIG. 2 is graphically shown.

Finally, in FIG. 5 the transmission output gear ratio is diagramed which is calculated by taking the change in the two inputs to the summing planetary devices and multiplying it by 5. In mathematical terms, the transmission output gear ratio can be determined as follows:

A is output of non-circular gears;
B is input to summing planetary gears; and
C is transmission output gear ratio
$B = 3A$
$C = (\ B) \times 5$ The present invention as described in general and in detail hereinabove and as illustrated in the accompanying drawings provides a device for the transmission of mechanical power different from any in the prior art and one which has numerous advantages and applications. The present invention provides an infinitely gearing speed system which incorporates optimal number of operating components, including non-circular gear sets, planetary gears, clutches and summers. The present invention can be used to smooth torque fluctuations by inducing the appropriate speed fluctuations between input and output. Furthermore, the present invention can be used in quick return operations as it has a slow active portion of the cycle followed by a very fast return.

The present device can be used with a reciprocating rack to generate a given motion function, including special cases of harmonic and periodic motions. In addition, the present invention can be utilized for motions that require dwell and indexing transmission.

The use of the device could be used in automobiles, bicycles and even transmissions for matching human power for exercise, physical therapy and rehabilitation. Even furthermore, the present invention could be utilized with non-parallel and non-intersecting input and output shafts.

Although only one preferred embodiment of the present invention has been described in detail, all improvements and modifications incorporating the invention as set forth in the claims or their equivalents are included in this invention.

List of Components (For convenience of the Examiner)
1. input shaft
2. input gear train
3. non-circular gear sets
4. "on/off" clutches
5. output gear trains
6. output shaft
7. phase shift controller
8. "on/off" clutch
9. intermediate input shafts
10a & 10b. mating elements of non-circular gear body 15
11a & 12b. ring gears
12a & 12b. planet gear
13. non-circular gear
14. body incorporating 24a, 24b, 27a and 27b
15. non-circular gear body
16. ring gear
17. fixed housing
18. sun gear
19a & 19b. planet pinions
20. control element/controller
21a & 21b. planetary summing devices
22. second gear set
23. non-circular gear 13
24a & 24b. non-circular gears
25a & 25b. intermediate shafts
26a & 26b. clutches
27a & 27b. inner races for clutches 26a & 26b
28a & 28b. external gears and outer races for clutches 26a & 26b
29a & 29b. external gears
30a & 30b. ring gears
31a & 31b. shafts of planet pinions 19a & 19b
32. guide arm
33a & 33b. non-circular gears
34a & 34b. non-circular gears mating with 13
35a & 35b. sun gears
36a & 36b. arms
37a & 37b. planet pinions
38a & 38b. ring gears
39a & 39b. gear set comprising sun gear and external gear
40. concentric gear on output shaft
41. clutch Having described our invention, we claim the following:

1. A gear system for motion transformation comprising:

an input shaft for introduction of motion into the system;

a first set of gears connected to the input shaft for division of the motion;

a means for controlling phase shift in the division of motion attached to the first set of gears;

a second set of gears connected by intermediate shafts to the first set of gears;

"on/off" clutches for selection of desired segments from the second set of gears;

a third set of gears connected by intermediate shafts to the "on/off" clutches for summing the motion output from the clutches; and an output means for transmission of a resulting motion from the system to a load connected to the output means.

2. The gear system of claim 1 wherein the first set of gears comprises a first non-circular gear affixed directly to the input shaft so that it rotates at the same speed as the input shaft and a set of gears that comprises a sun gear rigidly affixed to the input shaft which is in mesh with planet pinions which, in turn, are in mesh with ring gears affixed to the housing, the position of one of said ring gears being governed by the means for controlling phase shift in the division of motion resulting from the input shaft.

3. The gear system of claim 1 wherein the means for controlling the phase shift in division of motion resulting from the first set of gears is a self-locking device that controls the position of a ring gear in the first set of gears.

4. The gear system of claim 2 wherein the second set of gears comprises at least two sets of non-circular gears where one set is in continuous mesh with one of the non-circular gears of the first set of gears and the other set of non-circular gears is in continuous mesh with the other non-circular gear of the first set of gears where each set of non-circular gears are on opposite sides of the input shaft and free to rotate about the intermediate shafts.

5. The gear system of claim 1 wherein the "on/off" clutches, when engaged, are connecting the second gear set to the third set of gears rotating about the intermediate shaft.

6. The gear system of claim 4 wherein the third set of gears comprises a sun gear rigidly affixed to each of the intermediate shafts which is in mesh with planet gears which, in turn, are driven by one set of the non-circular gears of the second set of gears and ring gears which are in mesh with the planet gears and driven by the other set of non-circular gears of the second set of gears.

7. The gear system of claim 5 wherein the output means for transmission of a resulting motion when the resulting motion is to be the same as the input motion comprises an output shaft which is connected to the input shaft by a clutch which, when engaged, provides the same output motion as the input motion.

8. The gear system of claim 1 wherein the input shaft is rotatably supported by a fixed housing encasing the gear system.

* * * * *